C. H. PRIEST.
GREASE ARRESTER FOR SHAFTS.
APPLICATION FILED JULY 11, 1916.
1,240,602.
Patented Sept. 18, 1917.
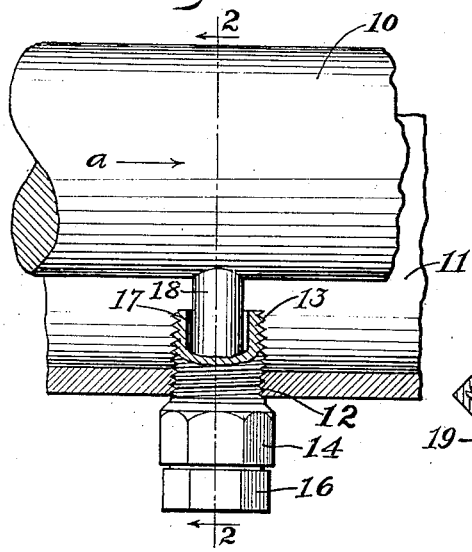
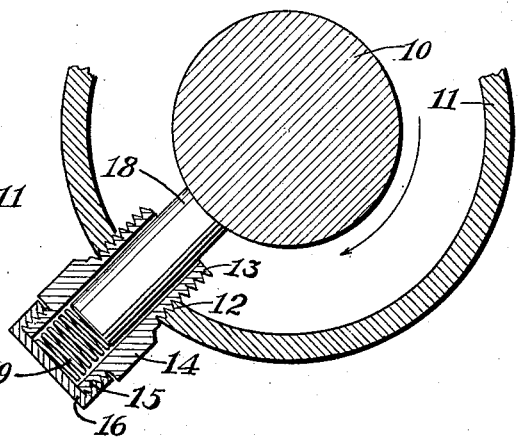
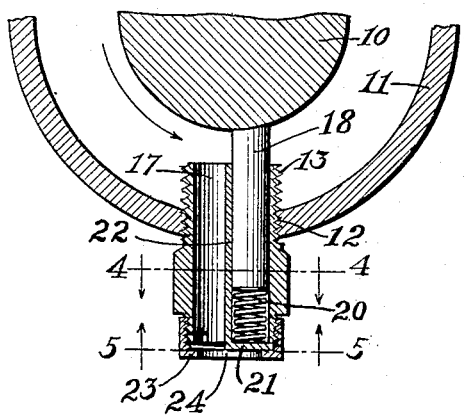
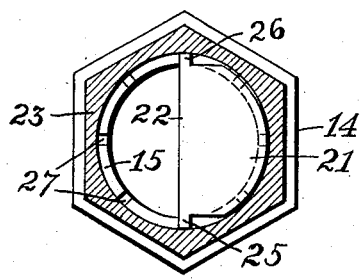
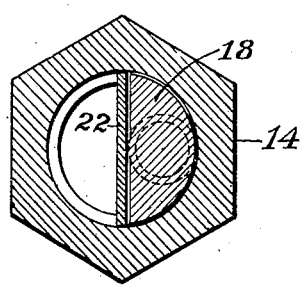
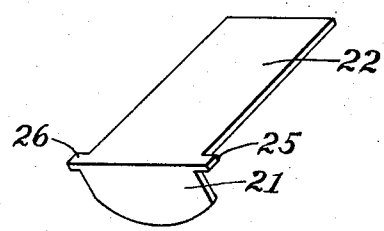
Inventor
Charles H. Priest
by Hazard Berry & Miller
att'ys.

UNITED STATES PATENT OFFICE.

CHARLES H. PRIEST, OF LOS ANGELES, CALIFORNIA.

GREASE-ARRESTER FOR SHAFTS.

1,240,602.  Specification of Letters Patent.  Patented Sept. 18, 1917.

Application filed July 11, 1916. Serial No. 108,581.

*To all whom it may concern:*

Be it known that I, CHARLES H. PRIEST, a citizen of the United States, residing at Los Angeles, in the county of Los Angeles and State of California, have invented new and useful Improvements in Grease-Arresters for Shafts, of which the following is a specification.

This invention relates to a grease arrester and particularly pertains to a device for preventing the travel of grease along a revolving shaft and is especially applicable for use upon the driving shaft within the rear axle of automobiles.

It is an object of this invention to provide a device for collecting the grease which accumulates upon rotating shafts, and divert it from its intended path of travel along the shaft so that the shaft will be substantially free from grease and it will be assured that parts in communication with the shaft will not be contaminated.

Another object of this invention is to provide means for maintaining the arrester brush in contact with the shaft and insuring that the wear of the brush will not render the device inoperative.

Another object is to provide means whereby the arrester may be readily mounted upon the rear axle of an automobile and may be designed for an interchange of parts necessary to cause the device to operate practically on all types of cars.

It is a further object to provide a grease arrester which is simple in construction and which may be readily applied to the rear axle housing of an automobile without difficulty and which will operate without possibility of being broken.

Other objects will appear hereinafter.

The invention is illustrated in the accompanying drawings in which:

Figure 1 is a view in partial section illustrating the shaft as rotatably mounted within a suitable housing and particularly illustrating the manner in which the grease arrester is mounted through the housing.

Fig. 2 is a view in vertical section as seen on the line 2—2 of Fig. 1 and particularly illustrates the disposition of the arrester brush within its mounting plug and in engagement with the rotatable shaft.

Fig. 3 is a view in fragmentary vertical section illustrating a modified form of the invention in which the grease is adapted to be drained from the shaft housing.

Fig. 4 is a view in horizontal section as seen on the line 4—4 of Fig. 3 and shows the sectional configuration of the arrester brush as used in the modified form of the invention.

Fig. 5 is a view in horizontal section illustrating the manner in which the brush retainer plate is adjustably secured within its mounting plug.

Fig. 6 is a view in perspective illustrating the retainer plate employed in the modified form of the invention.

Referring to the drawings more particularly, 10 indicates a cylindrical shaft which is adapted to be driven from some suitable source of power and as shown in the drawings, is intended to indicate the driving shaft of an automobile rear axle. The shaft is inclosed within a housing 11 of any suitable configuration which is provided with an internally threaded bore 12 formed at an angle of about 45 degrees to a vertical plane passing through the shaft 10.

The bore 12 is adapted to receive the threaded end 13 of a mounting plug formed with a hexagonal head 14 by which the plug may be screwed into place. The plug is formed with a threaded extension 15 upon the opposite side of the hexagonal head 14 for the reception of a retaining cap 16 which screws over the end of the plug and closes one end of a bore 17 extending throughout the length of the plug. The bore 17 is fitted with a fiber brush 18 formed with an arcuate end adapted to bear against and conform to the circumference of the shaft 10. This brush is held against the periphery of the shaft by means of a coil spring 19 which bears between the head of the cap 16 and the end of the brush and thus holds the brush against the shaft regardless of the wear upon the brush.

In the modified form of the invention the brush is semi-circular in section and is retained within the plug by a spring 20 supported by the end 21 of a retainer plate 22. This plate is of a width corresponding to the inside diameter of the bore 17 and is adapted to confine the brush along one side of the plug. An extension is formed on the plate to engage the spring. The retainer plate is held in position within the plug by a cap 23 formed with an opening 24 adapted to permit oil and grease to flow from the housing as arrested by the brush. As a means for holding the brush in alinement with the shaft and within the plug, a pair of ears 25 and 26 are formed upon the lower end of the retainer plate and engage diametrically opposite slots 27 which are disposed at given intervals around the edge of the plug extension 15. When the plate is placed in position with its ears within the slots, the cap 23 is screwed in place and insures that the plate will not become unseated nor be liable to turn.

When the device is to be used, the plug is suitably mounted within the shaft housing and the brush brought to bear against the shaft. Assuming that the grease tends to travel along the shaft in the direction of the arrow —a— it will be encountered by the brush as it rotates and will be caused to drip from the shaft and will flow back toward its starting point, thus retaining the outer portion of the shaft in a practically greaseless condition.

In the modified form of the device the grease is allowed to drain from the plug and will thereby meet the requirements of axles and shafting where it is not expedient for the grease to be returned.

It will thus be seen that the device here disclosed will effectively arrest grease which is traveling along a rotating shaft and will act in a simple manner without attention.

It is further evident that this device would work equally well upon line shafts, etc., without departing from the spirit of this invention.

I claim:

1. In a grease arrester, the combination of a rotating shaft, a housing therefor, a tubular member secured through said housing, a reciprocable grease wiper contacting with said shaft and slidably mounted in said member, and a spring pressing said wiper against said shaft, said tubular member having a passage whereby grease wiped from said shaft is diverted through said housing.

2. In a grease arrester, the combination of a rotating shaft, a housing therefor, a tubular member secured through said housing, a reciprocable grease wiper contacting with said shaft and slidably mounted in said member, a spring for pressing said wiper against said shaft, and an apertured screw-cap on the outer end of said member for adjusting said spring in relation to said wiper, said member having a passage whereby grease wiped from said shaft is diverted from said housing through said cap.

In testimony whereof I have signed my name to this specification.

CHAS. H. PRIEST.

Copies of this patent may be obtained for five cents each, by addressing the "Commissioner of Patents, Washington, D. C."